INVENTOR
THOMAS L. SHEPHERD
BY F B Henry
ATTORNEY

United States Patent Office 3,592,622
Patented July 13, 1971

3,592,622
OXY-FUEL ACCELERATED GLASS MELTING FURNACE AND METHOD OF OPERATION
Thomas L. Shepherd, Essex Fells, N.J., assignor to Air Reduction Company, Incorporated, New York, N.Y.
Filed June 5, 1968, Ser. No. 734,611
Int. Cl. C03b 5/04
U.S. Cl. 65—135                                                17 Claims

ABSTRACT OF THE DISCLOSURE

This specification discloses a method and apparatus for raising the temperature of the glass in a glass-fining furnace without producing a corresponding increase in the temperature of the crown of the furnace. The improved result is obtained by using auxiliary heat from an oxy-fuel burner flame projected into the furnace as a non-luminous flame, having low radiation. The flame is projected in the direction of the greater length of the furnace and from a level above the glass and downward at an angle which permits the combustion of the burner flame to be substantially complete before the products of combustion of the flame jet brushes the top surface of the molten glass. Heat is transferred from the products of combustion to the glass mainly by convection.

SUMMARY AND BACKGROUND OF THE INVENTION

For the fining of glass, it is heated to a temperature substantially above its melting point and for a substantial time in a "tank" which is essentially a reverberatory furnace. The output of the furnace can be increased by using higher temperatures, but there have been limits on the extent to which the glass furnace can be heated.

The majority of past attempts to utilize the high flame temperature and combustion efficiency of the oxy-fuel flame to increase the melting rate of raw materials in glass tanks have aimed at increasing the rate of radiation heat transfer from the flame to the glass bath. Means for accomplishing this purpose have included undershot oxygen, lances mounted beneath conventional air-fuel burners, auxiliary oxy-fuel burners firing either through the furnace roof or approximately in the same direction as the conventional burners and, in a limited number of cases, oxy-fuel burners firing above and paralled to the bath in close proximity to the location of the raw material feed.

Such attempts have not proven capable of effecting significant increases in melting rate; the reasons for lack of success appear to be fundamental to the glass melting operation. The surface of a molten glass bath reflects an appreciable percentage of incident radiant energy rather than absorbing and being heated by it. The reflected radiation is then absorbed by some area of the surrounding environment which is capable of absorbing a higher percentage of incident radiation than the bath surface. The glazed surface of masses of partially melted raw material also exhibits this property to a considerable extent. As a result, high temperature luminous flames in a glass tank display a dangerous tendency to increase the temperature of hot face refractories in preference to raising bath temperature. Refractory materials, particularly in the furnace crown (roof) are necessarily of high silica composition and, hence, subject to a definite limit on maximum operating temperature (about 2900° F.)

These factors seriously limit the permissible amount of high temperature radiant energy which may be safely used to supplement the normal energy input to a glass tank or furnace. Increased refractory temperature beyond the allowable limit will cause refractory damage and contamination of the glass. As a result, heretofore, the high firing rate capability of oxy-fuel burners could not be used advantageously to supplement the thermal radiation input to glass melting operations.

This invention places at one end of the furnace an oxy-fuel burner with adjustment of the fuel and oxygen to produce a non-luminous flame. This reduces the amount of heat that is transferred by radiation; and by locating the flame jet so that it is above the molten glass and sloping downwardly toward it at a slow angle, so that the combustion of the flame is complete before the products of combustion of the jet strike the surface of the molten glass, heat can be effectively transferred from the oxy-fuel burner flame to the molten glass by convection instead of by radiation.

The invention requires that a high-velocity, high-temperature flame or stream of combustion products be caused to impinge upon the surface of the bath and thence flow along the surface for the greatest practical distance from the point of impingement. The flame is not permitted to impinge directly on the bath surface but is positioned so that combustion is complete, or substantially complete, prior to impingement. Flame temperature and velocity of this invention fall into the 4000°–5000° F. and the 3000–3500 foot-per-second ranges, respectively. The oxygen required is at least enough to provide the stoichiometric amount necessary for the fuel and the stoichiometric ratio may range from 100 to 150 percent.

The distance from the terminus of the combustion zone of the flame jet to the point of impingement on the glass surface is preferably in the range from 2 to 10 feet for optimum results, with a burner heating a furnace approximately 36 feet in length.

Certain prior art systems have attempted to utilize downwardly directed oxy-fuel burners in glass melting furnaces. One such system is described in U.S. Letters Patent No. 3,337,324. In this system oxy-fuel flames are directed vertically downward so that they impinge upon the exposed exterior surface of the batch. It has been found that this often causes burning of the surface of the batch and can further cause small particles of the batch (sand, soda ash) to enter the atmosphere of the furnace. The particles may well be blown into and contaminate the end product and may adhere to the refractory and cause deterioration thereof. By directing the flame at an angle as discussed above and by not permitting the flame to impinge on the surface, the above mentioned problems have been overcome and unexpected results achieved.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views:

FIG. 4 being taken on the section line 4—4 of FIG. 3.

DETAILED DESCRIPTION OF THE PREFERRED EMBODIMENT

Figure 1:
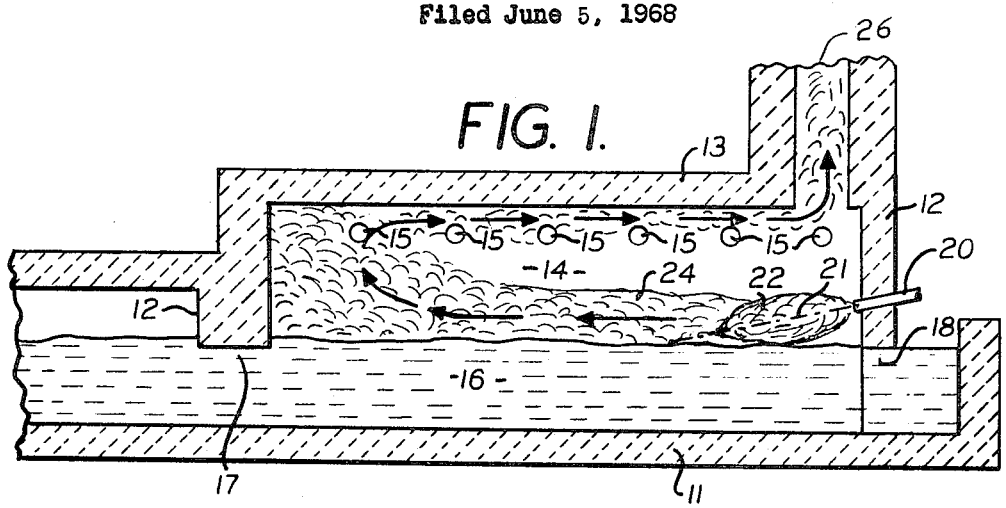
FIG. 1 is a diagrammatic vertical, sectional view through a glass furnace embodying this invention.
Figure 2:
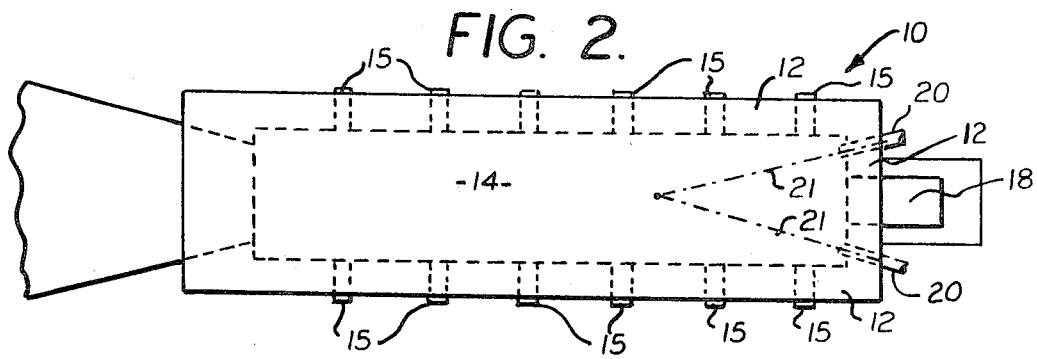
FIG. 2 is a diagrammatic top plan view of the construction shown in FIG. 1.

FIGS. 1 and 2 show diagrammatically a glass tank or furnace 10 with a bottom 11, walls 12 and top or crown 13. Within the furnace there is a chamber 14 which is heated by conventional air-fuel burners 15 at spaced locations along opposite walls 12 of the chamber 14. Molten glass in the furnace is indicated by the reference character 16. The molten glass is withdrawn from the chamber 14 through a submerged throat 17. Material is fed into the furnace at the other end through a feed-in entrance 18. The construction thus far described is conventional.

In order to increase the temperature in the furnace, and to transmit more heat to the glass in the furnace without raising the temperature of the ceramic refractory material of the furnace, and particularly the crown 13 which is especially vulnerable to overheating, the furnace 10 has two oxy-fuel burners 20 in the end wall 12 at the entrance end of the furnace. These burners 20 are located near opposite corners of the furnace and project through the wall 12 into the chamber 14.

The burners 20 slope downward and their axes 21 converge so that they intersect the surface of the molten glass about one-third of the way from the end wall 12 that holds the burners 20. In a chamber 14 having a length of approximately 36 feet, the axes of the burner flame jets meet and intersect the glass surface about 12 to 14 feet from the wall 12. The burner axes 21 converge at an angle of about 5½° to the center line and their slope to the horizontal is approximately 18½°. These values are given by way of illustration.

The oxygen supplied to the burners 20 is at least the stoichiometric amount and is preferably somewhat greater (100%–150%) so that the burning fuel jets, designated by the reference character 22, are non-luminous flames. This reduces radiation from the flames and thus reduces the heating effect of the flames 22 on the crown 13 of the furnace.

The location of the burners and their downward slope is proportioned to the velocity of the oxy-fuel jets and the rate of combustion so that the combustion is complete before the jets from the burners 20 strike the surface of the glass. Although some of the advantages of the invention can be realized even though the burner flames touch the glass surface, much better results are obtained and many problems avoided if only the products of combustion from the burners strike the surface of the glass. It is evident from FIG. 1 that the products of combustion are distributed over essentially all of the surface of the molten bath 16. This would not be the case if the oxy-fuel burner were mounted in the crown and directed vertically downward.

In actual experience with this invention, the burners 20 have been used to supply about 10.5% of the thermal input to the furnace. The products of combustion from the burners provide jets 24 that strike the glass at high velocity, and produce a rapid transfer of heat by forced convection. There is also a substantial heat transfer by conduction from the jets 24 to the glass; but radiation transfer is not a major factor and this lack of radiation from the jets protects the ceramic lining of the furnace, especially the crown 13. The melting rate of the furnace was found to be increased about 12% by the burners 20.

The products of combustion of the jets 24, after giving up substantial amounts of their heat to the glass, exhaust through a flue 26. The increase in the glass temperature by means of the burners 20 shortens the time required for refining the glass in the furnace and thus increases the amount of glass that can be put through the furnace in a given working period. Experience shows that the jets 24, after giving up heat to the glass, actually exert some cooling effect as they brush across the crown 13.

Figure 3:
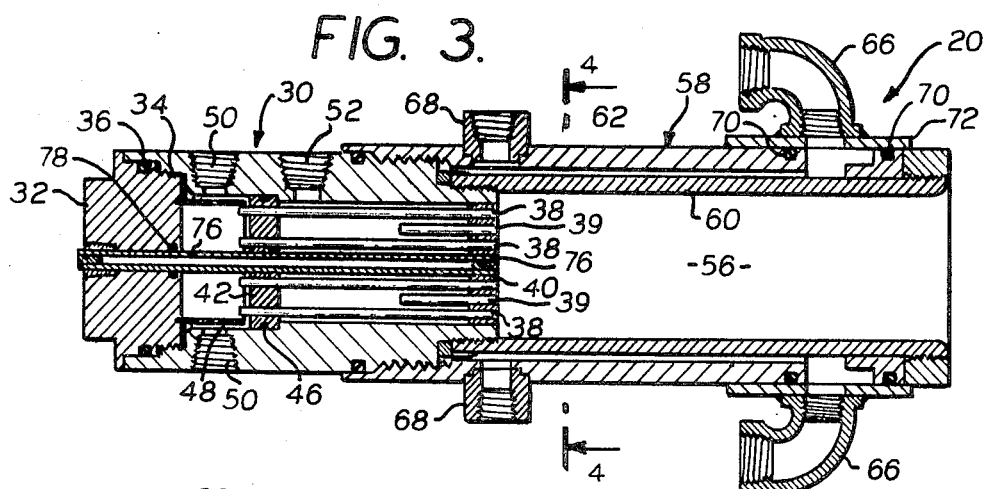
FIGS. 3 and 4 are greatly enlarged sectional views through one of the oxy-fuel burners shown in FIGS 1 and 2.
Figure 4:
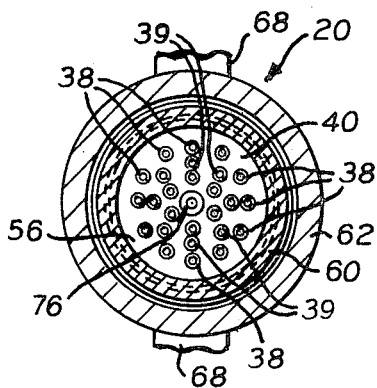

FIG. 3 illustrates an oxy-fuel burner especially suited for use according to this invention in a glass melting furnace. The burner is described in detail in U.S. Letters Patent No. 3,092,166. The burner is suited to accept and burn efficiently various fuels including gases and liquids. The advantages gained by using this type of high velocity oxy-fuel burner are clearly described in said patent. Basically the burner design provides for an intimate mixing of the fuel and oxygen, an anchored stable flame, adjustable heat output, adjustable flame length and combustion initiation in the combustion chamber.

The burner in FIG. 3 has a housing 30 with an end wall 32 attached to the side wall of the housing by screw threads 34 and sealed against leakage by an O-ring 36.

Within the housing 30 there is a bundle of tubes. This bundle of tubes includes long tubes 38 and short tubes 39, all of which extend through a circular position plate 40. The tubes 38 and 39 are firmly secured to the partition plate 40.

The long tubes 38 also extend through a rearward partition plate 42 and are firmly secured thereto. The short tubes 39, however, terminate in the space between the partition plates 40 and 42. The bundle of tubes is inserted into the housing 30, before the end wall 32 is screwed into the housing; and the rearward partition plate 42 contacts with a shoulder in the housing 30, to determine the position of the bundle of tubes and to hold the bundle with the forward partition plate 40 substantially even with the forward end of the housing 30.

When the end wall 32 is screwed into position, there are chambers for gas on both sides of the rearward partition plate 42 and there is an O-ring 46 for preventing gas in either chamber from mixing with the gas in the other chamber. A baffle 48 on the end wall 32 extends across the chamber behind the rearward partition plate 42. There are holes in the baffle for admitting gas to the open ends of the long tubes 38.

The housing 30 has two threaded inlet openings 50 through which oxygen is supplied to the chamber behind the rearward partition plate 48. There is another threaded opening 52 through the wall of the housing 30 for admitting fuel gas into the chamber ahead of the rearward partition plate 42. Tube or pipe fittings are screwed into these openings 50 and 52, and these fittings communicate with sources of oxygen and fuel gas. From the construction thus far described, it will be apparent that oxygen is discharged from the long tubes 38, and fuel gas from the short tubes 39, into a chamber 56 in front of the forward partition plate 40. This chamber 56 is enclosed within a double wall sleeve 58 having an inner wall 60 spaced from an outer wall 62 along most of the length of the sleeve 58. Water is circulated through the space between the inner wall 60 and the outer wall 62.

There are fittings 66 connected with the sleeve 58 near its forward end and communicating with the space between the walls 60 and 62 for supplying cooling water to the space between these walls. Other fittings 68 are connected to the sleeve 58 near its rearward end and communicate with the space between the walls for the discharge of cooling water.

The walls 60 and 62 are preferably made of stainless steel to resist the corrosive atmosphere in the glass tanks and they are threaded to the housing 30 with sealing rings for preventing leakage along the threads. At their forward ends, the walls 60 and 62 are connected by a fitting 72 which is free to move with respect to the outer wall 62 so as to compensate for differential expansion of the walls 60 and 62. Sealing rings 70 prevent leakage of water between the fitting 72 and the outer wall 62.

The torch has a single tube 76 for supplying liquid fuel to the chamber 56 when the torch is used with liquid fuel. This tube 76 passes through the end wall 32 and through the partition plates 40 and 42. In the preferred construction it is secured to the partition plates 40 and 42 and thus constitutes a part of the bundle of tubes. Where it passes through an opening in the end wall 32, a sealing ring 78 is provided for preventing leakage of gas. In carrying out this process natural gas has been used without any liquid fuel, and the tube 76 is closed off with plugs at either end. The type of fuel that is used in this process is dependent on the fuels that are available in the area of operation and their price compatability with the process. If conditions allow, both liquid and gaseous fuels may be used at the same time. In the tests that were run, natural gas was used.

The tubes 38 and 39 are angularly spaced around circles. The outer tubes 38 are at 30° spacings from one another in the construction illustrated, and there are, therefore, twelve tubes around this circle. The short tubes 39 are also angularly spaced around a circle, but the circle is of less diameter and the tubes are spaced from one another by an angle of 45°. This provides for eight short tubes 39. The inner long tubes 38 are located around a circle of smaller diameter with the angular spacing of the tubes 60°. This provides for six of the inner tubes 38.

Other combinations of the tube spacing and numbers of tubes can be used, but it is important that the oxygen and fuel issue from a plurality of tubes which are spaced from one another so that there is some clearance between the jets which are discharged from the tubes. However, the tubes should be close enough together so as to have some mixing of the eddy currents from the different gas streams.

Experience with this process demonstrates that it provides a feasible method of adding a substantial increase in heat to the glass bath by convective heat transfer to the surface without a proportionate increase in radiation. This is obtained by utilization of one or more high temperature, high velocity, non-luminous flames directed to impinge upon the bath surface. The area of impingement is preferably one in which sufficient unmelted raw material exists either below the bath surface or upon the surface in a "glazed over" condition to provide a heat sink for energy transferred by convective mode from the current of hot combustion products.

The process was used with burners mounted through the end wall at the feed end of the tank at the corners about 14 inches above the glass level and angled so that the projected flame axes intersected the bath surface about 12 or 14 feet from the end wall and on the bath center line. The horizontal and vertical angles of the two burners were made as nearly identical as possible and were measured at 5½ and 18½ degrees respectively.

The burners were ignited at 1:45 in the afternoon. The gas flow to the two burners was 3000 s.c.f.h. and oxygen flow was 4500 s.c.f.h. Immediately after burner light-off temperatures increased all over the tank; the initial firing rate was maintained until 7:30 the next morning in an effort to determine the equilibrium temperature that would eventually result.

The temperatures measured at 7:30 a.m. after 18 hours of firing at 3000 s.c.f.h. natural gas flow and 4500 s.c.f.h. oxygen flow had apparently reached or nearly reached equilibrium levels. Summarizing the temperature increases observed during this period, the results were as follows:

|  | Fining end | Melting end | Crown | Flue gas | Wall (avg.) |
|---|---|---|---|---|---|
| Base | 2,735 | 2,580 | 2,735 | 2,400 | 2,558 |
| After 18 hours of oxy-fuel firing | 2,770 | 2,630 | 2,760 | 2,504 | 2,658 |

The most notable aspect of the changed conditions within the tank as revealed by these data is the relatively small increase in crown temperature compared to the rise in bath temperature.

The increase in wall temperature is thought to be due to interaction between flames from the air-fuel wall burners and the high velocity oxy-fuel flames. The increase in wall temperature was not a cause for concern since the wall refractory is characteristically of higher duty brick than can be used in the crown. Also, the nominal increase in crown temperature was not considered dangerous since a crown of this type normally can be operated as high as 2900° F. or more without difficulty.

Later the burner firing rate was increased to 3,000 s.c.f.h. natural gas and 6,000 s.c.f.h. oxygen flow. This change was made in an effort to attain the target fining end temperature of 2800° F. and also to investigate the upper limit of burner firing rate. It had been thought that the upper limit of this burner would be determined by noise level; this proved to be the case since the burner screamed at any oxy-fuel ratio other than 2:1 at the 3,000 s.c.f.h. natural gas flow rate. At the stoichiometric ratio and this firing rate however, the burner was acceptably quiet, the flame was non-luminous and about 10 feet long measured from the burner muzzle. Bath temperatures started to rise when the firing rate was increased. One and one-half hours after the increase in firing rate, the fining end temperature had reached 2800° F. This firing rate was maintained throughout the remainder of the trial. The temperature pattern in the tank at the time the target fining end temperature was attained was as follows:

|  | ° F. |
|---|---|
| Fining end | 2800 |
| Melting end | 2700 |
| Crown | 2775 |
| Walls | 2703 |
| Flue gas | 2640 |

Summarizing the conclusions which are apparent from a study of the temperature pattern:

(1) Heat is not transferred from the crown or walls to the fining end of the bath since bath temperature in this region is higher than at any other point in the tank.

(2) The melting end is heated in reverberatory fashion by radiation from the fining end to the crown and from the crown to the melting end.

(3) Heat is transferred from the non-luminous oxy-fuel flame and the stream of combustion products in contact with the bath via the convective mode. Two considerations support this view:

(a) The non-luminous flame and its associated stream of combustion products are directed to impinge upon the bath surface and, therefore, to flow toward the fining end in contact with the molten glass. Since the gaseous stream is at a substantially higher temperature (3500–4000° F.) than the surface and moving at a high velocity with respect to it, convective heat transfer from the gas to the glass will occur.

(b) Heat transfer from the non-luminous (stoichiometric) flame and/or combustion products via the radiation mode cannot take place at the required rate due to the very low emissivity of such systems.

(4) The crown is cooled by the combustion products.

This is particularly true in view of the fact that feed to the tank at the time of observance of the foregoing temperature pattern had been increased by about 7% over normal practise and hence the rate of bath cooling by incoming cold raw material was greater than normal.

An additional benefit resulting from high fining end temperature was that of improved glass quality. Ware from #4 molding machine which received glass from "B" tank in which the oxy-fuel burner was mounted, normally displayed a seed count in the range 8 to 16 seeds per ounce of glass. When the fining end temperature had reached 2780–2800° F., the seed count dropped to the 2 to 6 range and did not rise substantially above this level in spite of the fact that melting rate during the ensuing period was increased to approximately 12% above the normal level; a condition which would ordinarily cause an increase in seed count.

The tank was operated at the 12% increased melting rate and an oxy-fuel firing rate of 3,000 s.c.f.h. natural gas and 6,000 s.c.f.h. oxygen flow. After about 2 days operation, the burner was shut off and removed from the tank. No corrosive attack or other kind of damage was observed in any part of the burner structure; it was concluded that if the cooling water flow was maintained at an adequate level, burner life in this application would be satisfactory.

The preferred embodiment of the invention has been illustrated and described, but changes and modifications can be made and some features can be used in different combinations without departing from the invention as defined in the claims.

I claim:

1. A reverberatory glass melting furnace including a glass-containing chamber having ends including a fining end, a feed-in entrance through which raw glass making materials are introduced into the chamber to maintain a glass level therein, means to withdraw refined glass from said chamber, a crown of refractory material serving to direct radiant energy into the glass during the operation of the furnace, air-fuel burner means positioned to direct combustion products into the chamber above the level of said glass, an oxy-fuel burner at a level above the glass and having a discharge end positioned below the air-fuel burner means and directed at an angle toward the surface of the glass in the chamber, means supplying oxygen and fuel in proportions to produce a substantially non-luminous flame from the oxy-fuel burner, the elevation and vertical angle of the burner being correlated to make substantially all of the products of combustion from the oxy-fuel burner sweep across the surface of the glass in substantially the same direction for a substantial part of the length of the chamber whereby heat is transferred from the oxy-fuel burner combustion products to the glass largely by convection.

2. The glass melting furnace described in claim 1 characterized by the elevation and vertical angle of the burner being correlated with the flame from the burner to obtain substantially complete combustion of the fuel before the products of combustion of the oxy-fuel burner contact with the surface of the molten glass within the chamber.

3. The glass melting furnace described in claim 1, characterized by the furnace chamber being of substantially greater end-to-end length than transverse width, the oxy-fuel burner being located at the end of the furnace opposite the fining end and facing in a direction to project its flame lengthwise of the furnace toward the fining end thereof, said flame and the products of combustion of the flame beyond the zone of combustion extending for most of the length of the chamber, said products of combustion initially contacting the glass in the chamber at a location within the region of from approximately one-third to one-half of the length of the chamber measured from that end of the chamber at which the oxy-fuel burner is located.

4. The glass melting furnace described in claim 1 characterized by the oxy-fuel burner including a plurality of jet outlets spaced from one another over an area and from which oxygen streams are discharged, a plurality of other jet outlets spaced from one another and from the oxygen jet outlets, but dispersed among said oxygen jet outlets so that the jets discharged from all of the outlets intermingle, a chamber into which all of the jet outlets discharge and in which the intermingled jets join in a common oxy-fuel jet that burns in said chamber and that discharges from said chamber as a flaming oxy-fuel mixture, means proportioning the oxygen and fuel to obtain a flame temperature within the range of 4000 to 5000° F., and means supplying the oxygen and fuel at pressures which provide a jet velocity of 3000 to 3500 feet per second.

5. The method of increasing the melting and refining rate in a reverberatory glass tank comprising directing at least one air-fuel flame into said tank above the surface of the glass, directing an oxy-fuel flame into said tank so that said oxy-fuel flame projects below said air-fuel flame and along a slight downward slope toward the surface of the glass being melted and refined, supplying to the oxy-fuel flame at least the stoichiometric requirement of oxygen to maintain the oxy-fuel flame substantially non-luminous and thereby reduce radiant heating of the top of the tank, said oxy-fuel flame being so directed that substantially all of the products of combustion therefrom impinge upon the said surface and then sweep along a substantial portion of the entire length of the tank, said products of combustion thereby causing high rates of convective heat transfer to the said surface.

6. The method described in claim 5 characterized by substantially completing the combustion of the oxy-fuel flame before allowing the products of combustion therefrom to contact the surface of the glass.

7. The method described in claim 6 characterized by the oxy-fuel flame temperature being between about 4000 to 5000° F. and impinging the products of combustion on said surface at a region of from about 2 to 10 feet beyond the end of the combustion zone of the oxy-fuel flame.

8. The method described in claim 7 characterized by projecting the flame downward so that the products of combustion strike the molten glass at an angle of approximately 18½° to the horizontal.

9. The method described in claim 5 characterized by forming said oxy-fuel flame by discharging oxygen in a plurality of spaced streams over an area in which the oxygen streams are spaced from one another, and discharging a plurality of streams of fuel over the same area and with the streams of fuel spaced from one another over said area but intermingled with the oxygen streams to form an oxy-fuel flame which is directed away from one end of the tank and along said downward slope toward a top surface of the glass to be heated.

10. A process for the continuous manufacture of glass in a reverberatory furnace comprising, supplying raw glass making materials to said furnace to maintain a desired molten bath level therein, withdrawing refined glass from the glass bath in said furnace, supplying heat to said bath by directing at least one air-fuel flame into said furnace from above the level of the bath, supplying additional heat to said bath by directing at least one oxy-fuel flame into said furnace from a level above the bath but below the level of the said air-fuel flame, impinging the products of combustion from said oxy-fuel flame, but not the flame itself, on the molten bath so that substantially all of the said products of combustion sweep along a substantial part of the length of the bath to thereby effectively transfer heat from the products of combustion to the bath by the convective mode.

11. A glass melting furnace comprising a chamber having a length and a width, a melting zone at one end of said chamber and a fining zone at the other end of said chamber, means to introduce raw glass making materials into said melting zone, means to withdraw refined glass from said fining zone, a primary source of heat for said furnace comprising air-fuel burner means to direct at least one air-fuel flame into said chamber, a secondary source of heat for said furnace comprising oxy-fuel burner means positioned below said air-fuel burner means to direct combustion products at the surface of the molten bath in said chamber, said oxy-fuel burner means being positioned so that substantially all of the products of combustion therefrom strike the surface of the bath at a slight angle and thereafter sweep across a substantial part of the length of the molten bath.

12. A glass furnace as defined in claim 11 in which the oxy-fuel burner means is positioned to direct the products of combustion from the melting zone into the fining zone along the surface of the bath.

13. A glass furnace as defined in claim 11 in which the oxy-fuel burner means is mounted in an end wall of said chamber.

14. A glass furnace as defined in claim 11 in which the oxy-fuel burner means projects an oxy-fuel flame combustion zone which substantially ends about 2 to 10 feet away from the surface of the molten bath, said distance being measured along the projected main axis of said combustion zone.

15. A glass furnace as defined in claim 14 in which the combustion zone temperature falls within the 4000°–5000° F. range and in which the products of combustion which sweep across the molten bath are in the 3500°–4000° F. range.

16. A process for the continuous manufacture of glass in a glass tank comprising, supplying raw glass making materials to said tank to maintain a desired molten bath level therein, withdrawing refined glass from the glass bath in said tank, supplying heat from a primary low temperature source to said bath for melting and refining said glass, supplying additional heat to said bath from a secondary high temperature source comprising at least one oxy-fuel flame, directing said oxy-fuel flame into said tank from a level above the bath but below the level of the said primary source and at a slight downward angle so that the products of combustion from said oxy-fuel flame impinge on the bath surface and sweep along a substantial part of the length of the bath to thereby effectively transfer heat from the products of combustion to the bath and raise the temperature of the bath to a level above that normally attained by the use of the primary source alone.

17. A process as defined in claim 16, further comprising positioning said oxy-fuel flame so that the combustion zone thereof substantially ends about 2 to 10 feet away from the surface of the glass bath, said distance being measured along the projected axis of the combustion zone, said distance insuring that only products of combustion impinge on the bath surface.

References Cited
UNITED STATES PATENTS

| | | | |
|---|---|---|---|
| 2,068,924 | 1/1937 | Mulholland | 65—135 |
| 3,092,166 | 6/1963 | Shepherd | 431—9 |
| 3,249,417 | 5/1966 | Zonneveld | 65—136X |
| 3,337,324 | 8/1967 | Cable, Jr. et al. | 65—135 |

ARTHUR D. KELLOGG, Primary Examiner

U.S. Cl. X.R.

65—136, 335, 337